Figure 1:
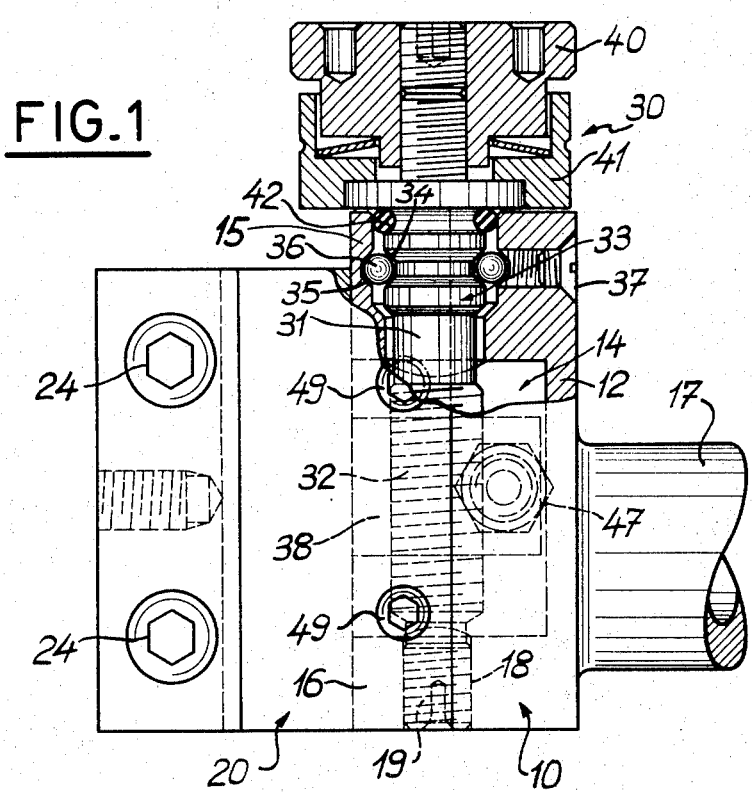

United States Patent [19]
Willen

[11] 3,822,619
[45] July 9, 1974

[54] TOOL HOLDER ASSEMBLY HAVING MEANS FOR SELECTIVELY ADJUSTING THE POSITION OF THE WORK TOOL

[75] Inventor: Charles Willen, Villeneuve, Switzerland

[73] Assignee: Charles Willen & Cie., Villeneuve, Switzerland

[22] Filed: Oct. 5, 1973

[21] Appl. No.: 404,127

Related U.S. Application Data

[60] Division of Ser. No. 386,297, Aug. 7, 1973, which is a continuation of Ser. No. 67,370, Aug. 27, 1970.

[30] Foreign Application Priority Data

Aug. 29, 1969  Switzerland....................... 13108/69
Aug. 29, 1969  Switzerland....................... 13109/69
Aug. 29, 1969  Switzerland....................... 13110/69
Aug. 29, 1969  Switzerland....................... 13112/69

[52] U.S. Cl. .................................. 82/36 R, 29/57
[51] Int. Cl............................................. B23b 29/10
[58] Field of Search.............. 82/36 R, 36 A, 35, 24, 82/1.2; 29/57

[56] References Cited
UNITED STATES PATENTS

| | | | |
|---|---|---|---|
| 2,314,314 | 3/1943 | Wettig | 29/57 |
| 2,340,029 | 1/1944 | Weingartner | 82/24 |
| 2,456,140 | 12/1948 | Mueller et al. | 29/57 |
| 3,067,637 | 12/1962 | Horning | 82/1.2 |

*Primary Examiner*—Leonidas Vlachos
*Attorney, Agent, or Firm*—Emmanuel J. Lobato; Robert E. Burns; Bruce L. Adams

[57] ABSTRACT

A tool holder assembly comprises a support member connectable to a machine tool and having therein a linear slideway. A slide member is slideably mounted in the slideway and the slide member is provided with a tool-holding recess for releaseably holding a work tool. An adjustment device coacts with the support member and the slide member for selectively adjusting the position of the slide member along the slideway to thereby accordingly effect adjustment of the work tool. The adjustment device comprises a screw mounted on the support member for rotational movement but not translational movement and the screw has a threaded portion which extends through a cavity provided in the support member. The slide member is provided with a threaded nut which extends into the cavity and in threaded engagement with the screw so that angular displacement of the screw effects linear displacement of the slide member along the slideway. A manually graspable knob is connected to the screw to enable manual adjustment of the slide member.

10 Claims, 2 Drawing Figures

PATENTED JUL 9 1974 3,822,619

TOOL HOLDER ASSEMBLY HAVING MEANS FOR SELECTIVELY ADJUSTING THE POSITION OF THE WORK TOOL

The present application is a division of application Ser. No. 386,297 filed on Aug. 7, 1973 which in turn is a continuation of application Ser. No. 67,370 filed on Aug. 27, 1970.

The present invention relates generally to tool holder assemblies for machine tools and more particularly, pertains to a tool holder assembly having means for adjusting the radial position of the work tool relative to the rotary axis of the machine tool.

Tool holder assemblies are known which include tool supports for supporting a work tool and which have an adjustment mechanism for adjusting the position of the work tool. The prior art adjustment mechanisms do not enable precise adjustment of the work tool and suffer from the drawback that the machining forces developed during the machining operation are transmitted through the tool holder assembly to the adjustment mechanism thereby altering the present adjustment. In order to prevent undesirable alteration of the work tool position, it has become common practice in the art to construct the tool holder assembly out of heavy material having a rather bulky construction. Moreover, heavy-duty bearings are customarily employed in the adjustment mechanism in order to withstand the large machining forces. As a result, the prior art mechanisms are costly to manufacture and provide only a very limited space around the work tool so that it is not possible to gain easy access to the work tool.

It is therefore a primary object of the present invention to provide a tool holder assembly having means for effecting exact adjustment of the position of the work tool and which is easy to manufacture and compact in size as compared to the prior art tool assemblies.

It is another object of the present invention to provide a tool holder assembly having an adjustment mechanism for adjusting the position of the work tool and wherein the adjustment mechanism is effectively isolated from the machining forces applied to the work tool during a machining operation so that the precise adjustment of the work tool is maintained for a long period of time.

These and other objects of the invention are carried out by providing a tool holder assembly composed of a tool support slideably mounted along a linear slideway formed in a support member and an adjustment device for adjusting the position of the tool support along the slideway. The adjustment device comprises a screw mounted for rotational movement but not translational movement on the support member and a threaded member connected to the tool support and in threaded engagement with the screw so that rotational movement of the screw effects translation of the threaded member and hence translation of the tool support along the slideway. The screw has a shank portion having an annular groove therein defining an inner bearing race and the support member has an annular groove therein which defines an outer bearing race. A set of rollable members are rollably mounted between the inner and outer bearing races and by such a construction, the screw is mounted for rotation but not for translation.

Figure 2:
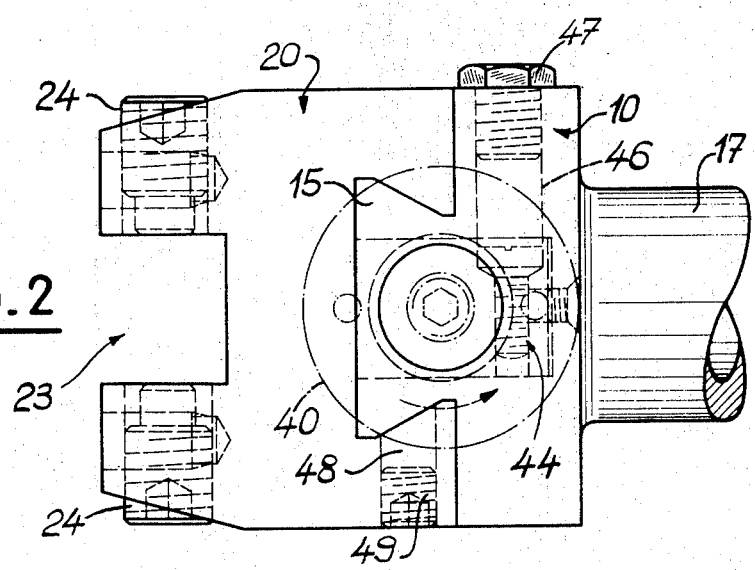

Having in mind the above and other objects that will be evident from an understanding of this disclosure, the present invention comprises the combinations and arrangements of parts as illustrated in the presently preferred embodiment of the invention which is hereinafter set forth in sufficient detail to enable those persons skilled in the art to clearly understand the function, operation, construction and advantages of it when read in conjunction with the accompanying drawings, wherein like reference characters denote like parts in the various views, and wherein:

FIG. 1 is a side elevational view, partly cut away and partly in cross-section, of a tool holder assembly according to the invention; and FIG. 2 is a plan view of the tool holder assembly shown in FIG. 1 with portions thereof removed for clarity.

The tool holder assembly comprises a support member 10 slideably supporting a slide member 20. The support member 10 comprises a main body 12 having therein a hollow cavity 14 and having an upper part 15 and a lower part 16. As seen in FIG. 2, the support member 10 comprises a flared tenon having a dovetail configuration which defines a linear slideway on which the slide member 20 is mounted. The support member 10 further includes a mounting shank 17 connected to another side of the body 12 and the remote end of the shank (not shown) is slideably received within a bore of a machine tool during use of the tool holder assembly.

The slide member 20 comprises a tool support and is provided with an elongated channel having a dovetail cross-sectional configuration complementing that of the support member 10. By such a construction, the slide member 20 is slideably mounted upon the support member 10 for translational sliding movement along a linear axis which is perpendicular to the longitudinal axis of the shank 17 and the slide member is prevented from undergoing angular or rotational movement. The slide member 20 is provided with a tool-holding recess 23 for receiving and holding a work tool (not shown) during use of the tool holder assembly. A set of four locking screws 24 are symmetrically disposed about the recess 23 and are threaded into threaded bores provided in the slide member. The locking screws 24 engage with the work tool and function to releaseably lock the work tool on the slide member.

In accordance with the invention, the micrometric radial adjustment device 30 coacts with the support member 10 and the slide member 20 to selectively adjust the radial position of the slide member relative to the longitudinal axis of the support member mounting shank 17. The radial adjustment device 30 comprises a screw 31 having an externally threaded portion 32 and a shank portion 33. The screw 31 extends through an opening in the upper part 15 of the support member 10 and through the cavity 14, as seen in FIG. 1. The free end of the screw tapers to a cylindrical portion which rotatably rests within a bore 18 provided for this purpose in the lower part 16. The bore 18 is threaded and is closed by a threaded plug 19. The longitudinal axis of the screw 31 is parallel to the axis of translational movement of the slide member 20 and is perpendicular to the longitudinal axis of the mounting shank 17 and the adjusting screw 31 is mounted for rotational movement but not axial movement within the support member 10.

The mounting means for mounting the adjusting screw in this manner comprises a ball bearing assembly including a plurality of rollable members comprising spherical balls 36 which are rollably disposed between an outer surface portion of the adjusting screw 31 and an inner surface portion of the upper part 15. The outer periphery of the screw 31 is provided with an annular recess which defines an inner race 34 of the ball bearing unit and as seen in FIG. 1, the inner race has the shape of a truncated V having two converging surfaces which each make point contact with the balls 36. Likewise, the upper part 15 is provided with an annular recess which defines an outer race 35 having the configuration of a truncated V with two converging surfaces which also make point contact with the balls. Thus each ball 36 makes four-point contact with the races which exert stress on the balls at their four points of contact. As seen in FIG. 1, the upper part 15 of the support member 10 is provided with a throughbore to permit introduction of the spherical balls into the ball bearing unit and a screw 37 is threaded into the bore to close same. An important feature of the invention resides in utilizing surface portions of the support member 10 and the adjusting screw 31 as the bearing races so that a much more compact and sturdy structure may be formed.

Cooperating with the adjusting screw 31 is a threaded portion of the slide member 20. The threaded portion comprises a threaded member 38 rigid with the slide member and having an internally threaded bore in which is screwed the adjusting screw 31. The threaded member 38 is in the form of an internally threaded nut and has a much smaller height dimension than the cavity 14 so that the threaded member may undergo translational movement for a predetermined limited extent in opposite directions along the adjusting screw in response to rotation of the adjusting screw. Since the threaded member 38 is affixed to the slide member 20, any movement of the threaded member is transmitted into a corresponding movement of the slide member and thus it may be seen that the slide member may be slid along the slideway defined by the support member 10 in response to angular displacement of the adjusting screw 31.

Rotation of the adjusting screw 31 is accomplished by a manually graspable knob 40 which is rigidly attached to the shank portion of the adjusting screw 31. A graduated or calibrated ring 41 is disposed around the upper shank portion of the screw and is urged thereagainst by a spring mounted beneath the knob 40. A sealing ring 42 is mounted about the shank portion 33 at the mouth of the opening in the body 12 to protect the ball bearing assembly from the ingress of foreign matter.

Means are provided for eliminating free play between the threaded portion 32 of the adjusting screw 31 and the threaded member 38. This means comprises a slot in the outer extremity of the member 38 which divides same into two opposing legs and a screw 44 is threaded through the opposing legs and turned in one direction to draw the legs closer together thereby tightening the engagement between the mating threads and eliminating the play or turned in the other direction to force the legs further apart in order to introduce more play. The adjustment of the screw 44 is made with a screwdriver or the like and a bore 46 is provided in the main body 12 for this purpose. The bore 46 is closed by a threaded bolt 47 to prevent the ingress of dirt and other foreign matter.

Locking means are also provided for locking the slide member 20 in a selected position on the support member 10. The locking means comprises at least one gib 48 having a bearing surface complementary to that of a surface portion of the support member 10. The gib 48 is slideable in a bore provided in the slide member 20 and a locking screw 49 is threaded into the bore and urges the gib into frictional contact with the support member 10 to thereby hold or releasably lock the slide member in position on the support member.

During operation of the tool holder assembly, a work tool is attached to the slide member 20 and secured in position by tightening down the locking screws 24. The support member 10 is slideably mounted on the machine tool by inserting the remote end of the mounting shank 17 into a bore provided for this purpose on the machine tool. Then the position of the work tool is radially adjusted relative to the longitudinal axis of the mounting shank 17 by the adjusting mechanism of the invention and this is accomplished by manually rotating the knob 40 to rotate the adjusting screw 31 in the proper angular direction to obtain the proper amount and direction of sliding movement of the slide member 20.

For example, if the knob 40 is rotated in the direction of the arrow shown in FIG. 2, the adjusting screw 31 will be rotated in the same direction and due to the mounting of the screw, the screw will only rotate and will not translate. The rotation of the screw coacts with the threaded member 38 to cause downward translational movement of the slide member 20, as viewed in FIG. 1, accompanied by radial inward movement of the work tool. In a similar manner, if the knob 40 is angularly displaced in the reverse direction, the slide member 20 will undergo translational movement in the upper direction in FIG. 1 to effect radial outward movement of the work tool and in this manner, the radial position of the work tool can be selectively adjusted in dependence upon the angular setting of the knob 40. Moreover, the exact extent of movement of the slide member 20 relative to the support member 10 may be easily effected by reading the graduations provided on the graduated ring 41.

The tool holder assembly of the invention is designed either for use alone so that radial adjustment of the work tool may be made or in combination with an axial adjustment device so that both radial and axial adjustment of the work tool may be made. A particular axial adjustment device is disclosed in parent application Ser. No. 67,370 and in copending application Ser. No. 404,128 filed concurrently herewith.

The invention has been described in conjunction with one preferred embodiment and obvious modifications and changes will be evident to those skilled in the art and the present invention is intended to cover all such modifications and changes falling within the spirit and scope of the invention as defined in the appended claims.

I claim:

1. A tool holder assembly for releasably holding a work tool comprising: a support member having means defining a linear slideway; a slide member slideably mounted on said support member for sliding movement along said slideway and having means for releaseably holding a work tool during use of the tool holder assembly; and adjusting means for selectively adjusting the position of said slide member along said slideway to accordingly effect adjustment of the position of the work tool comprising a screw having a shank portion and a threaded portion, mounting means mounting said screw on said support member for rotational movement but not translational movement including opposed surface positions of said support member and said screw shank portion defining respectively outer and inner bearing races and a set of rollable members rollably disposed between said inner and outer bearing races, and threaded means threadedly connected to said screw threaded portion for effecting sliding displacement of said slide member along said slideway in response to angular displacement of said screw; whereby the position of the work tool can be selectively adjusted in response to angular adjustment of said screw.

2. A tool holder assembly according to claim 1; wherein said opposed surface portions of said support member and said screw shank portion each has an annular groove therein with a truncated V-shaped cross-section defining the respective bearing races, and wherein said set of rollable members comprises a plurality of substantially spherical balls.

3. A tool holder assembly according to claim 1; wherein said threaded means has a slot therein for permitting play between said threaded means and said screw thread portion, and means for adjustably setting the extent of said play.

4. A tool holder assembly according to claim 1; wherein said threaded means comprises a threaded member rigidly connected to said slide member and having means therein defining a threaded opening threadedly engaged with said screw thread portion, means defining a slot in the outer extremity of said threaded member dividing same into two opposing spaced-apart legs, and another screw threadedly interconnecting said two legs to adjustably set the extent of play between said threaded member and said screw threaded portion.

5. A tool holder assembly according to claim 1; wherein said adjusting means includes a manually graspable knob connected to one end of said screw for effecting manual angular displacement of said screw.

6. A tool holder assembly according to claim 5; further including a ring disposed about said knob and containing graduations therearound.

7. A tool holder assembly according to claim 1; including a mounting shank connected to said support member for mounting the tool holder assembly during use upon a machine tool, said mounting shank extending transversely of the axis of said linear slideway.

8. A tool holder assembly according to claim 1; wherein said support member comprises a main body having means therein defining a cavity and having means on one side thereof defining said slideway; and wherein said slide member has means therein defining an elongated channel having a shape complementing that of said slideway and slideably disposed upon said support member.

9. A tool holder assembly according to claim 8; wherein said screw extends through said cavity with said screw threaded portion disposed within said cavity, and wherein said threaded means is disposed within said cavity for translational movement therein in response to angular displacement of said screw.

10. A tool holder assembly according to claim 1; wherein said opposed surface portions of said support member and said screw shank portion each has an annular groove therein with a truncated V-shaped cross-section defining the respective bearing races which receive therebetween said rollable members.

* * * * *